United States Patent
Beaud et al.

(10) Patent No.: US 8,800,295 B2
(45) Date of Patent: Aug. 12, 2014

(54) DEVICE AND A METHOD FOR REGULATING A TURBINE ENGINE, AND AN AIRCRAFT

(71) Applicant: Eurocopter, Marignane, Cedex (FR)

(72) Inventors: Southdary Beaud, Carpentras (FR); Laurent Martin, Chateaurenard (FR)

(73) Assignee: Airbus Helicopters, Marignane Cedex (FR)

( * ) Notice: Subject to any disclaimer, the term of this patent is extended or adjusted under 35 U.S.C. 154(b) by 65 days.

(21) Appl. No.: 13/751,266

(22) Filed: Jan. 28, 2013

(65) Prior Publication Data

US 2013/0199197 A1   Aug. 8, 2013

(30) Foreign Application Priority Data

Feb. 6, 2012  (FR) ...................................... 12 00345

(51) Int. Cl.
*F02C 1/00* (2006.01)
(52) U.S. Cl.
USPC .............................................. 60/772; 60/773
(58) Field of Classification Search
CPC ........... B64C 27/04; B64D 31/00; F02C 9/00; F02C 9/28; F05D 2220/329; F05D 2220/76; F05D 2270/02
USPC .................... 60/772, 773, 784, 785, 786, 788
See application file for complete search history.

(56) References Cited

U.S. PATENT DOCUMENTS

| 3,255,586 | A | * | 6/1966 | Hennig et al. ................. 60/773 |
| 4,514,976 | A | * | 5/1985 | Christoff .......................... 60/785 |
| 5,174,105 | A | * | 12/1992 | Hines ................................ 60/774 |
| 5,309,707 | A | * | 5/1994 | Provol et al. .................... 60/773 |
| 6,364,602 | B1 | | 4/2002 | Andrew | |
| 7,513,120 | B2 | | 4/2009 | Kupratis | |
| 2005/0150229 | A1 | * | 7/2005 | Baer et al. ...................... 60/772 |
| 2006/0042252 | A1 | | 3/2006 | Derouineau | |
| 2006/0101826 | A1 | | 5/2006 | Martis | |
| 2012/0023960 | A1 | * | 2/2012 | Minto ............................. 60/772 |

FOREIGN PATENT DOCUMENTS

| EP | 1712761 A2 | 10/2006 |
| FR | 2968716 A1 | 6/2012 |
| GB | 2251657 A | 7/1992 |

OTHER PUBLICATIONS

Search Report and Written Opinion; Application No. FR 1200345; dated Oct. 3, 2012.

* cited by examiner

*Primary Examiner* — Phutthiwat Wongwian
(74) *Attorney, Agent, or Firm* — Brooks Kushman P.C.

(57) ABSTRACT

A regulator device (10) for reducing the risk of surging in a turbine engine (3) that includes a gas generator (4), an air extractor (8), and a mechanical power take-off device (100). An engine computer (11) includes storage (16) that stores a plurality of acceleration regulation relationships, each acceleration regulation relationship corresponding to air extraction in a first range, and to mechanical power take-off in a second range. The regulator device (10) including a first measurement device (20) for measuring current air extraction, and a second measurement device (30) for measuring current mechanical power take-off, with the engine computer (11) controlling acceleration of the turbine engine (3) by implementing the acceleration regulation relationship corresponding to the current air extraction and to the current mechanical power take-off.

17 Claims, 1 Drawing Sheet

DEVICE AND A METHOD FOR REGULATING A TURBINE ENGINE, AND AN AIRCRAFT

CROSS REFERENCE TO RELATED APPLICATIONS

This application claims priority to French patent application No. FR 12 00345 filed on Feb. 6, 2012, the disclosure of which is incorporated in its entirety by reference herein.

BACKGROUND OF THE INVENTION (1) Field of the Invention

The present invention relates to a device and to a method for regulating a turbine engine, in particular of a rotorcraft, making it possible to control the acceleration of the engine.

(2) Description of Related Art

This type of engine is fitted with a regulator system having the main function of regulating, in flight, the power that is delivered by the engine. The speed of rotation of the main lift or indeed propulsion rotor of the rotorcraft is thus maintained at a substantially constant value.

A rotorcraft is piloted in particular by acting on the pitch of the blades of the main rotor. An increase in the pitch causes a rapid drop in the speed of rotation of the rotor due to the increase in the drag of the rotor. The engine must then be accelerated rapidly in such a manner as to compensate for this drop so that the rotorcraft can be kept stabilized in flight. Likewise, when the pitch of the blades is decreased, it is necessary to decelerate the engine so that the speed of rotation of the rotor does not exceed the limit set by the manufacturer.

Furthermore, the engine must be regulated so as to enable the main rotor to absorb more power, but without running the risk of the engine surging. "Surging" is a phenomenon that affects the compressors of turbine engines when, locally, an excessive angle of incidence of a blade or a vane gives rise to aerodynamic separation, thereby considerably reducing the flow rate of air. One consequence of this phenomenon is overheating in the combustion chamber, which can lead to damage to a turbine of the engine.

Furthermore, engine surging may lead to a loss of power, to the appearance of vibration likely to damage bearings and to reduce passenger comfort for example, to the appearance of abnormal noises, or to the emission of flames.

Surging may also lead to engine flameout.

Likewise, decelerating must also be controlled so as to avoid engine flameout.

A Full Authority Digital Engine Control (FADEC) electronic regulator device is known. Regulation relationships, e.g. for regulating acceleration or deceleration, are programmed into the electronic regulator device so as to regulate the engine, but without running the risks of the engine surging or of flameout.

Furthermore, the electronic regulator device receives signals from sensors that measure various parameters of the engine. As a function of such parameters, the electronic regulator device uses regulation relationships so as to control an actuator that adjusts the fuel flow rate by acting on the position of the fuel flow rate metering unit.

Conventionally, engines are designed to operate without surging in their utilization envelope.

Under such circumstances, a regulation relationship for normal operation is established so as to present a first margin that is large relative to a surge zone of the engine.

Furthermore, a regulation relationship for acceleration is established. The acceleration regulation relationship presents a second margin that is small relative to a surge zone of the engine.

The acceleration regulation relationship may take into consideration air being extracted from the gas generator of the engine at a constant and maximum rate, or indeed mechanical power being extracted (known as power take-off (PTO)) from the gas generator of the engine at a constant rate.

In a graph plotting the compression ratio of the gas generator of an engine up the ordinate axis against the flow rate of air from the gas generator along the abscissa axis for a transient acceleration stage, an operating point of the engine moves away from a normal operating line that corresponds to the normal regulation relationship and reaches an acceleration operating line that corresponds to the acceleration regulation relationship. Reference may be made to the literature to obtain such a diagram.

The acceleration operating line is thus arranged between the normal operating line and a surging line representing the surging state of the engine.

The surge margin of the engine thus decreases when the engine accelerates. As a function of the intensity of the acceleration, a surge phenomenon is sometimes seen to appear.

In order to limit such phenomena, a system provided with a discharge valve may be implemented.

Likewise, a system known under the acronym IGV for "Inlet Guide Vanes" may be implemented.

Such systems make it possible to increase surge margins.

The prior art thus includes a single acceleration regulation relationship, possibly taking into consideration constant air extraction or constant mechanical power extraction (or "take-off") from the gas generator of the engine, and a plurality of systems that may be activated so as to avoid a surge phenomenon appearing.

Document EP 1 712 761 describes an engine provided with electrical equipment. The electrical equipment makes it possible to extract power so as to improve a surge margin.

The technological background also includes documents U.S. Pat. No. 6,364,602, US 2006/042252, US 2006/101826, GB 2 251 657, and FR 2 968 716.

BRIEF SUMMARY OF THE INVENTION

The present invention also seeks to provide a method of reducing the risk of an engine surge phenomenon appearing, and in particular in an aircraft engine.

In the invention, a method is implemented for reducing the risk of a surge phenomenon appearing in a turbine engine, the engine including a gas generator, air extraction means for extracting air from the gas generator, and mechanical power take-off means that co-operate mechanically with the gas generator.

In the method:

a plurality of acceleration regulation relationships are established before the engine is used and they are stored in an engine computer by the manufacturer, each acceleration regulation relationship corresponding to air extraction performed by said air extraction means in a first range, and to mechanical power take-off performed by the mechanical power take-off means in a second range;

while the engine is being used, current air extraction and current mechanical power take-off is measured continuously, e.g. over a sampling period of the order of tenths of a second; and acceleration of the engine is controlled by implementing the acceleration regulation relationship corresponding to the current air extraction and to the current mechanical power take-off.

The applicant has observed that the air extraction has an effect on the surge margins. By increasing the air extraction, an operating line of the engine moves away from a surge zone.

By taking into consideration a plurality of air extraction levels instead of a maximum level, the risk of the surge phenomenon appearing is reduced.

Furthermore, mechanical power take-off is usually performed on a gas generator of an engine by electrical equipment of the electricity-generator type. The electrical equipment may also be used as a starter.

The mechanical power take-off causes the gas generator to brake by imposing an opposing torque on a shaft of the gas generator, for example. When the gas generator is rotating at a constant speed, mechanical power take-off tends to move an engine closer to its surge zone.

By taking into consideration a plurality of mechanical power take-off levels instead of a constant level, the risk of the surge phenomenon appearing is reduced.

In novel manner, the above-described method thus suggests defining a set of acceleration regulation relationships, each regulation relationship being associated with given levels of air extraction and of mechanical power take-off.

This method may also include one or more of the following characteristics.

For example, in order to measure the air extraction, the air extraction flow rate is measured by the air extraction means.

Furthermore, the mechanical power take-off means comprise electrical equipment, and the mechanical power take-off is determined by measuring electrical power supplied by the electrical equipment.

The mechanical power take-off means transform mechanical power into electrical power that is consumed by the aircraft. Under such circumstances, the electrical power supplied by the electrical equipment is measured.

In another aspect, when the air extraction is not at its maximum and thus does not reach a predefined limit, the air extraction is increased so as to accelerate the engine.

The increase in air extraction causes a change from the current acceleration regulation relationship to a more severe acceleration regulation relationship.

In a variant, or in addition, when said mechanical power take-off is not zero, said mechanical power take-off is interrupted so as to accelerate said engine.

The decrease in mechanical power take-off causes a change from the current acceleration regulation relationship to a more severe acceleration regulation relationship.

It should be understood that it is possible to verify beforehand that the aircraft may temporarily operate in the absence of such mechanical power take-off, e.g. by taking more power from another engine where appropriate, or by drawing from the power from a battery.

In another aspect, at least three air extraction ranges may be established that correspond to low air extraction, intermediate air extraction, and high air extraction respectively.

Likewise, at least three mechanical power take-off ranges may be established that correspond to low mechanical power take-off, intermediate mechanical power take-off, and high mechanical power take-off respectively.

The resulting combination may thus lead to the establishment of new distinct acceleration regulation relationships.

In addition to a method, the invention also provides a regulator device for reducing the risk of a surge phenomenon appearing in a turbine engine, the engine including a gas generator, air extraction means for extracting air from the gas generator, and mechanical power take-off means that co-operate mechanically with the gas generator. The engine is controlled by an engine computer such as an engine computer known under the acronym FADEC for "full authority digital engine control".

The regulator device is remarkable in particular in that the engine computer includes storage means that store a plurality of acceleration regulation relationships, each acceleration regulation relationship corresponding to air extraction performed by the air extraction means in a first range, and to mechanical power take-off performed by the mechanical power take-off means in a second range.

The regulator device also includes first measurement means for measuring current air extraction, and second measurement means for measuring current mechanical power take-off, which first and second means are connected to the engine computer.

The engine computer thus executes stored instructions so as to control acceleration of the engine by implementing the acceleration regulation relationship corresponding to the current air extraction and to the current mechanical power take-off.

The device may also include one or more of the following characteristics.

For example, the first measurement means comprise a measurement device for measuring the air extraction flow rate.

In addition, the mechanical power take-off means comprise electrical equipment, and the second measurement means comprise a measurement device for measuring electrical power supplied by the electrical equipment.

Such electrical equipment may be an electricity generator, possibly performing the additional function of a starter.

Finally, the invention provides an aircraft provided with a turbine engine that includes a gas generator, air extraction means for extracting air from the gas generator, and mechanical power take-off means that co-operate mechanically with the gas generator.

The aircraft thus includes a regulator device of the invention for implementing the above-described method.

BRIEF DESCRIPTION OF THE SEVERAL VIEWS OF THE DRAWINGS

The invention and its advantages appear in greater detail from the following description of embodiments given by way of illustration and with reference to the accompanying figures, in which.

DETAILED DESCRIPTION OF THE INVENTION

Elements that are present in more than one of the figures are given the same references in each of them.

Figure 1:
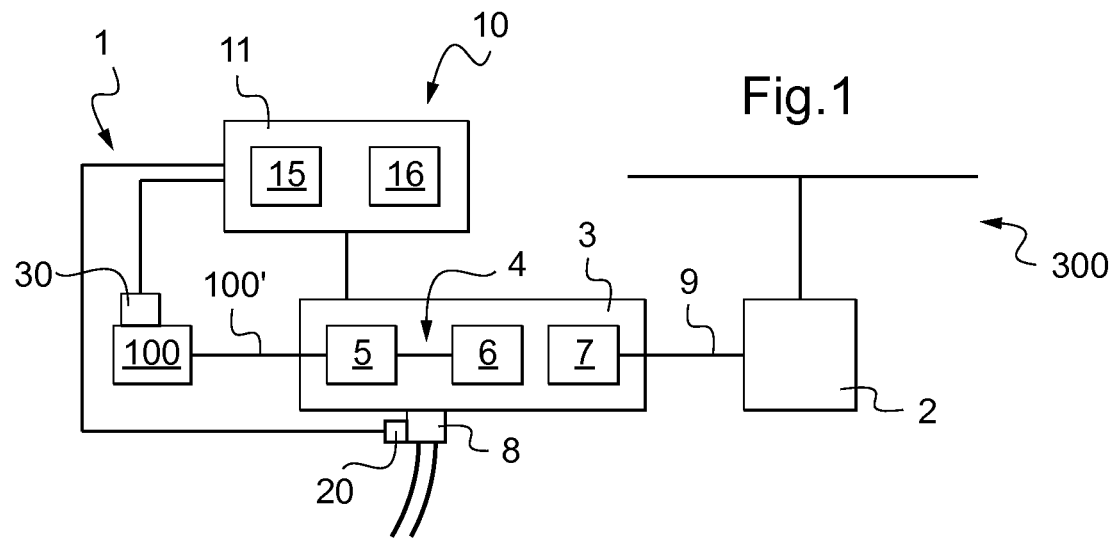
FIG. 1 is a view of an aircraft of the invention.

FIG. 1 shows an aircraft 1 having a rotary wing 300.

The aircraft 1 includes at least one turbine engine 3 for driving the rotary wing 300 by means of a main power transmission gearbox (MGB) 2.

Each engine includes a gas generator 4 and a free turbine 7. For example, the gas generator includes a compressor 5 that co-operates with a high-pressure turbine 6, the high-pressure turbine 6 being arranged upstream from the free turbine 7.

The free turbine 7 is thus connected to the main power transmission gearbox 2 by a drive train 9. By way of example, the drive train 9 is provided with an outlet shaft that is driven in rotation by the free turbine.

In addition, the engine has air extraction means 8 making it possible to take air from the gas generator. By way of example, extracted air may be used by a heating and air-conditioning system.

Furthermore, the engine includes means 100 for extracting mechanical power.

The mechanical power take-off means 100 may be electrical equipment of the electricity-generator type. The mechanical power take-off means 100 are thus driven in rotation by the gas generator 4 via a shaft 100', so as to power the electrical installation of the aircraft, e.g. including a battery.

The mechanical power take-off means 100 may also function in motor mode so as to perform a starter function.

The aircraft also includes a regulator device 10 for regulating the engine.

The regulator device 10 includes an engine computer 11, such as a FADEC computer.

The engine computer thus comprises a computation unit 15 and storage means 16, the computation unit executing instructions from the storage means 16 so as to regulate the engine. Such a computation unit may comprise at least one processor or any other equivalent means.

The engine computer 11 is thus connected to the engine 3 so as to apply at least one regulation relationship that seeks to control the position of a fuel flow rate metering unit.

Figure 2:
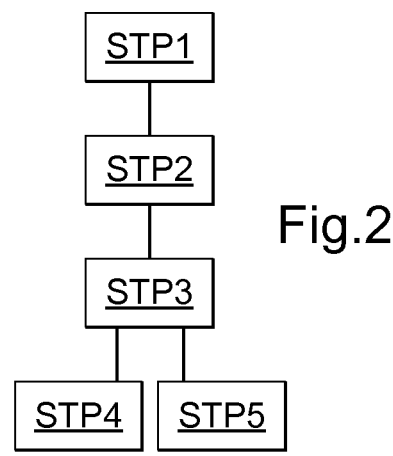
FIG. 2 is a diagram explaining the method applied.

With reference to FIG. 2, a manufacturer does not establish only one acceleration regulation relationship, but rather a plurality of regulation relationships during a step STP1.

Figure 3:
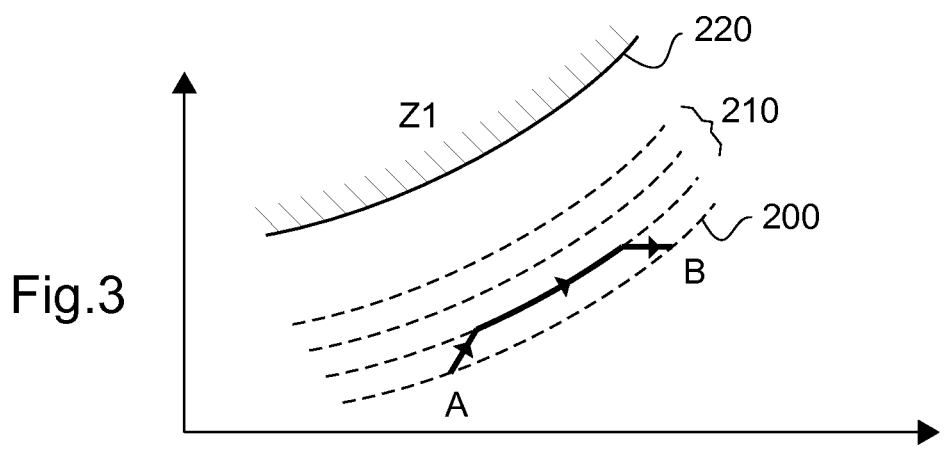
FIG. 3 is a diagram showing a surge limit of an engine.

FIG. 3 presents a graph plotting a compression ratio of the gas generator 4 up the ordinate axis, and an air flow rate through the gas generator along the abscissa axis.

The diagram presents a surging line 220 defining an operating zone that causes a surge phenomenon.

The manufacturer thus establishes a normal regulation relationship corresponding to a normal operating line 200.

Furthermore, the manufacturer establishes a plurality of acceleration regulation relationships that each correspond to an acceleration operating line 210.

In order to accelerate the engine so as to pass from an initial point A of the normal operating line 200 to a final point B of the normal operating line 200, it is thus necessary to switch from the normal regulation relationship to an acceleration regulation relationship 210 along the line shown in bold in FIG. 3.

Each acceleration regulation relationship thus corresponds to air extraction performed by the air extraction means 8 in a first range, and to mechanical power take-off performed by the mechanical power take-off means 100 in a second range.

As a function of the air or mechanical power being extracted, the corresponding operating line is closer to, or further away from, the surging line 220.

The manufacturer may establish at least three air extraction ranges that correspond to low air extraction, intermediate air extraction, and high air extraction respectively. Likewise, the manufacturer may establish at least three mechanical power take-off ranges that correspond to low mechanical power take-off, intermediate mechanical power take-off, and high mechanical power take-off respectively.

The manufacturer may thus deduce therefrom distinct acceleration regulation relationships, each acceleration regulation relationship being associated with a given air extraction range and a given mechanical power take-off range.

Under such circumstances, the storage means 16 of the engine computer stores the set of regulation relationships and their conditions of application.

While the engine 3 is being used, current air extraction and current mechanical power take-off is measured continuously during a measurement step STP2.

With reference to FIG. 1, the regulator device 10 thus includes first measurement means 20 for measuring current air extraction, which first measurement means are connected to the engine computer 11. For example, the first measurement means 20 are provided with a measurement device for measuring the air extraction flow rate.

Furthermore, the regulator device 10 includes second measurement means 30 for measuring current mechanical power take-off, which second measurement means are connected to the engine computer 11. Since the mechanical power take-off means 100 comprise electrical equipment, the second measurement means 30 may be provided with a measurement device for measuring the electrical power supplied by the electrical equipment.

With reference to FIG. 2, during a step STP3 of accelerating, as required by a maneuver of the aircraft, the engine computer 11 executes stored instructions so as to control acceleration of the engine 3 by implementing the acceleration regulation relationship corresponding to the current extractions of air and of mechanical power.

Optionally, during a first optimization step STP4, and when the air extraction is not at its maximum, the engine computer controls the air extraction means 8 so as to increase the extraction of air.

The increase in air extraction is detected by the first measurement means 20. The increase in air extraction is thus signaled to the engine computer 11. Since the current air extraction is increasing, the engine computer 11 thus implements a more severe acceleration regulation relationship that corresponds to the new levels of extraction of air and of mechanical power.

Likewise, during a second optimization step STP5, and when said mechanical power take-off is not at its minimum, the engine computer 11 co-operates with an avionics system so as to determine whether it is possible to interrupt mechanical power take-off.

If so, the engine computer 11 controls the mechanical power take-off means 100 so as to interrupt mechanical power take-off.

The resulting drop in mechanical power take-off is detected by the second measurement means 30, the drop being signaled to the engine computer 11. Since the current extraction of mechanical power is decreasing, the engine computer 11 thus implements a more severe acceleration regulation relationship that corresponds to the new levels of extraction of air and of mechanical power.

The second optimization step STP5 may be performed alone or in addition to the first optimization step STP4.

Naturally, the present invention may be subjected to numerous variations as to its implementation. Although several embodiments are described above, it should readily be understood that it is not conceivable to identify exhaustively all possible embodiments. It is naturally possible to envisage replacing any of the means described by equivalent means without going beyond the ambit of the present invention.

What is claimed is:

1. A method of reducing the risk of a surge phenomenon appearing in a turbine engine, the turbine engine including a gas generator, air extractor communicating with the gas generator and capable of extracting air from the gas generator, and mechanical power take-off means that co-operate mechanically with the gas generator, wherein:

a plurality of acceleration regulation relationships are established before the turbine engine is used and are stored in an engine computer by the manufacturer, each acceleration regulation relationship corresponding to air extraction performed by the air extractor in an air extraction range, and to mechanical power take-off performed by the mechanical power take-off means in a mechanical power take-off range;

while the turbine engine is being used, current air extraction and current mechanical power take-off is measured continuously; and acceleration of the turbine engine is controlled by implementing the acceleration regulation relationship corresponding to the current air extraction and to the current mechanical power take-off.

2. A method according to claim 1, wherein, in order to measure the air extraction, the air extraction flow rate is measured.

3. A method according to claim 1, wherein the mechanical power take-off means comprise electrical equipment, and the mechanical power take-off is determined by measuring electrical power supplied by the electrical equipment.

4. A method according to claim 1, wherein the air extraction has a minimum and a maximum, and wherein, when the air extraction is not at the maximum, the air extraction is increased so as to accelerate the turbine engine.

5. A method according to claim 1, wherein the air extraction has a minimum and a maximum, and wherein, when the mechanical power take-off is not at the minimum, the mechanical power take-off is interrupted so as to accelerate the turbine engine.

6. A method according to claim 1, wherein at least three air extraction ranges are established that correspond to low air extraction, intermediate air extraction, and high air extraction respectively.

7. A method according to claim 1, wherein at least three mechanical power take-off ranges are established that correspond to low mechanical power take-off, intermediate mechanical power take-off, and high mechanical power take-off respectively.

8. A regulator device for reducing the risk of a surge phenomenon appearing in a turbine engine, the turbine engine including a gas generator, air extractor communicating with the gas generator and capable of extracting air from the gas generator, and mechanical power take-off means that co-operate mechanically with the gas generator, the turbine engine being controlled by an engine computer;

wherein the engine computer includes storage that stores a plurality of acceleration regulation relationships, each acceleration regulation relationship corresponding to air extraction performed by the air extractor in an air extraction range, and to mechanical power take-off performed by the mechanical power take-off means in a mechanical power take-off range, the regulator device including first measurement means for measuring current air extraction, and second measurement means for measuring current mechanical power take-off, which first and second means are connected to the engine computer, the engine computer executing stored instructions so as to control acceleration of the turbine engine by implementing the acceleration regulation relationship corresponding to the current air extraction and to the current mechanical power take-off.

9. A regulator device according to claim 8, wherein the first measurement means comprises a measurement device for measuring the air extraction flow rate.

10. A regulator device according to claim 8, wherein the mechanical power take-off means comprise electrical equipment, and the second measurement means comprise a measurement device for measuring electrical power supplied by the electrical equipment.

11. A regulator device according to claim 10, wherein the electrical equipment is an electricity generator.

12. An aircraft provided with the turbine engine that includes the gas generator, the air extractor, and the mechanical power take-off means, the aircraft including the regulator device according to claim 8.

13. A regulator device for reducing the risk of a surge phenomenon appearing in a turbine engine, the turbine engine including a gas generator, an air extractor communicating with the gas generator and capable of extracting air from the gas generator, and a mechanical power take-off device that mechanically co-operates with the gas generator, the turbine engine being controlled by an engine computer, the engine computer including storage that stores a plurality of acceleration regulation relationships, each acceleration regulation relationship corresponding to an air extraction range performed by the air extractor, and to a mechanical power take-off range performed by the mechanical power take-off device, the regulator device including a first measurement device capable of measuring current air extraction, and a second measurement device capable of measuring current mechanical power take-off, the first and second measurement devices being connected to the engine computer, the engine computer executing stored instructions to control acceleration of the turbine engine by implementing the acceleration regulation relationship corresponding to the current air extraction and to the current mechanical power take-off.

14. A regulator device according to claim 13, wherein the first measurement device measures the air extraction flow rate.

15. A regulator device according to claim 13, wherein the mechanical power take-off device comprise electrical equipment, and the second measurement device measures electrical power supplied by the electrical equipment.

16. A regulator device according to claim 15, wherein the electrical equipment is an electricity generator.

17. An aircraft having the turbine engine and including the regulator device according to claim 13.

* * * * *